Figure 1:
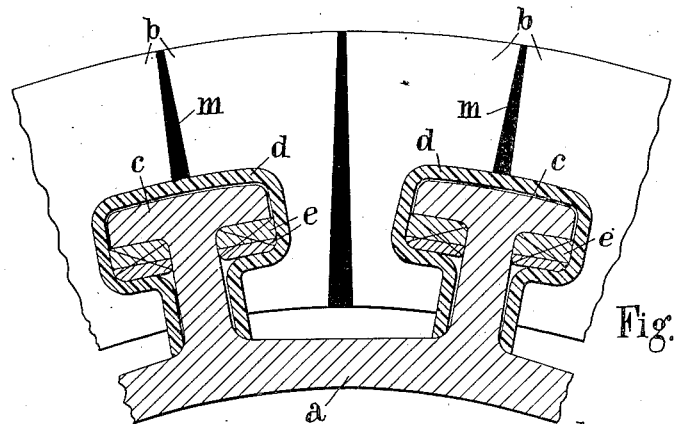

C. A. PARSONS, A. H. LAW & J. P. STOCKBRIDGE.
COMMUTATOR OF DYNAMO ELECTRIC MACHINES.
APPLICATION FILED APR. 9, 1910.

1,006,673.　　　　　　　　　　　　Patented Oct. 24, 1911.

3 SHEETS—SHEET 1.

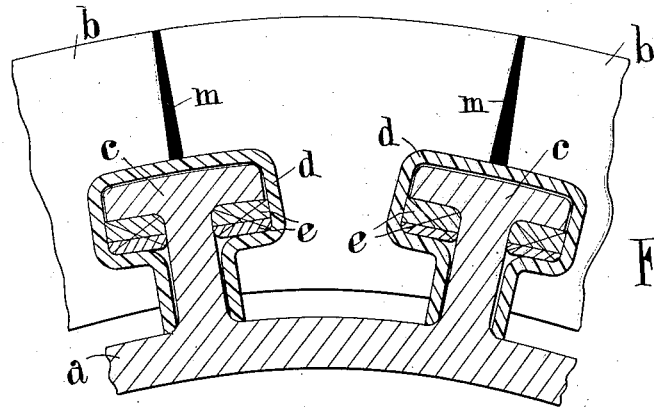
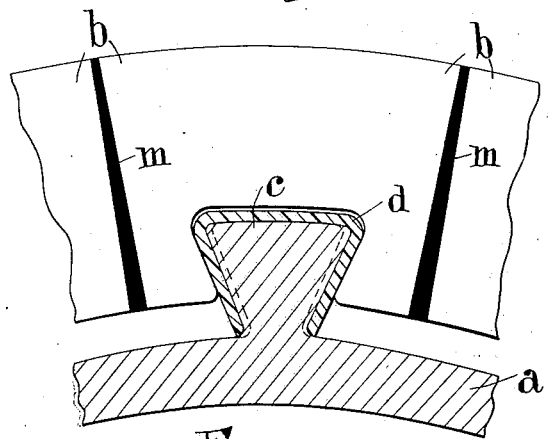
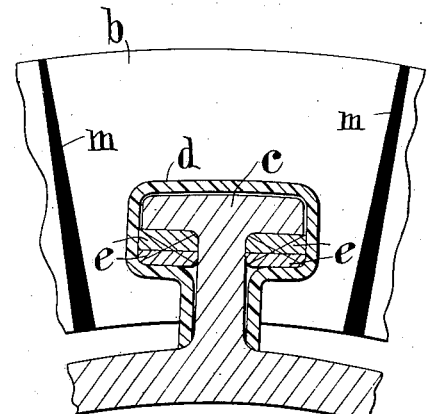
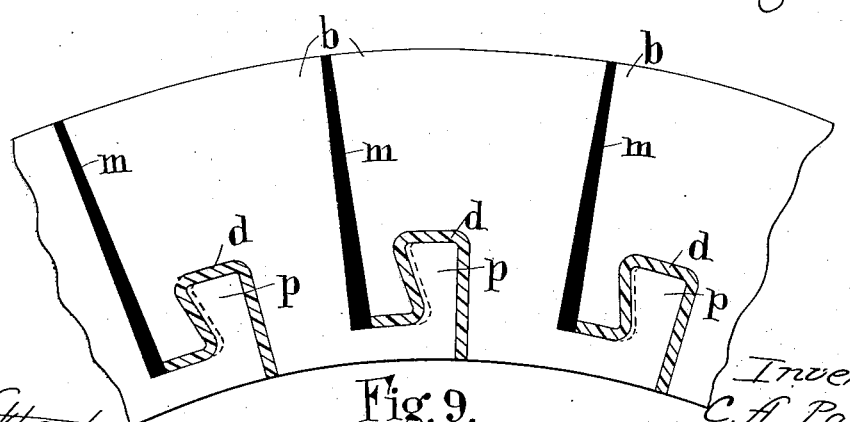

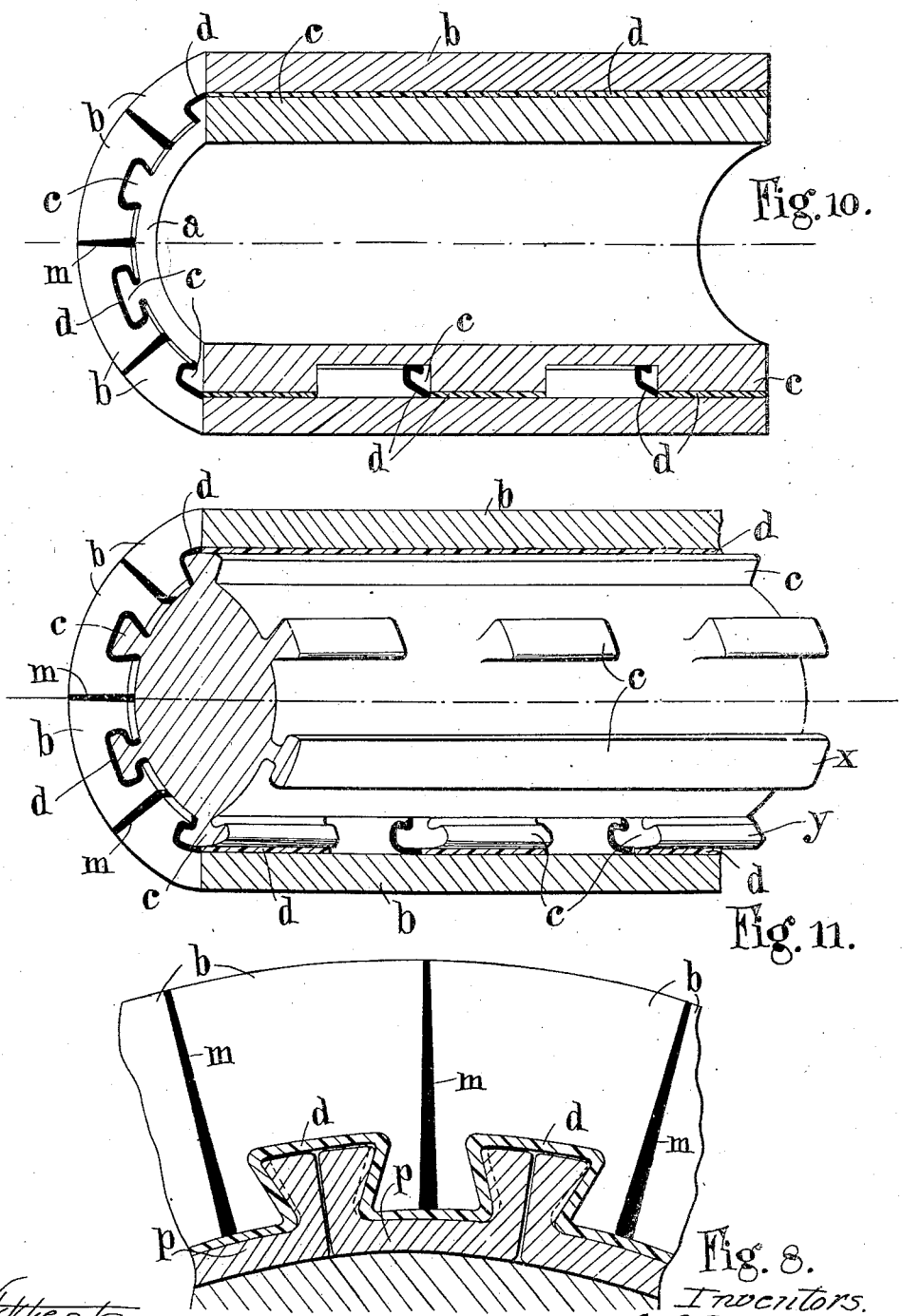

UNITED STATES PATENT OFFICE.

CHARLES ALGERNON PARSONS, ALEXANDER HENRY LAW, AND JOSEPH PEARCE STOCKBRIDGE, OF NEWCASTLE-UPON-TYNE, ENGLAND; SAID LAW AND STOCKBRIDGE ASSIGNORS TO SAID PARSONS.

COMMUTATOR OF DYNAMO-ELECTRIC MACHINES.

1,006,673.   Specification of Letters Patent.   Patented Oct. 24, 1911.

Application filed April 9, 1910. Serial No. 554,526.

*To all whom it may concern:*

Be it known that we, CHARLES ALGERNON PARSONS, C. B., ALEXANDER HENRY LAW, and JOSEPH PEARCE STOCKBRIDGE, subjects of the King of Great Britain and Ireland, all residing at Heaton Works, Newcastle-upon-Tyne, in the county of Northumberland, England, have invented certain new and useful Improvements in Commutators of Dynamo-Electric Machines, of which the following is a specification.

This invention relates to commutators of dynamo electric machines, and has for its object to provide improved means for holding the segments of such commutators.

In commutators of dynamo electric machines it has hitherto been the usual practice to hold the commutator bars in place either by cones at each end of the commutators so arranged as to force the segments radially inward or by rings shrunk externally onto the bars. Except in the case of very small armatures the latter construction has been universally adopted for the commutators of high speed dynamos such as are required for direct coupling to steam turbines. One objection to these external rings is that they occupy a great deal of useful commutator surface and this not only on account of their width but also because it is necessary to maintain a suitable clearance between the brushes and brush gear and the rings on each side. Thus a ring 2″ wide will render useless for the collection of current 3½″ of the commutator assuming that a clearance of ¾″ between the brushes and the commutator is required on each side of the rings. Further in order to secure sufficient mechanical strength these rings have to be made very large in cross section since being external to the commutator and consequently running at a very high speed the centrifugal hoop stress in these rings due to their own weight is considerable and therefore leaves only a comparatively small margin available for carrying the commutator bars. Another disadvantage of these rings is that should any excessive sparking occur at the brushes, an arc is liable to be formed between the commutator bars and the steel rings.

According to the present invention means are provided for holding the conducting segments of commutators of dynamo electric machines in place against centrifugal forces, which means comprise members engaging with longitudinal grooves cut in the sides or inner faces of the commutator bars. These holding means are entirely contained within the commutator, thus enabling the length of the commutator to be very materially reduced and rendering it possible to hold the bars in place with a much smaller amount of material than is the case in a construction where the supporting medium is external to the commutator. Means are provided for wedging together the segments and retaining members; in one construction an internal sleeve is provided with projections adapted to engage with corresponding recesses in the commutator bars. According to another construction the segments or bars are locked into one another so as to produce a complete stiff ring capable of supporting itself.

Referring to the accompanying drawings Figures 1 to 9 are transverse sections, showing various methods of carrying out this invention. Figs. 10 and 11 are diagrammatic sections through commutators constructed according to this invention.

Figure 2:
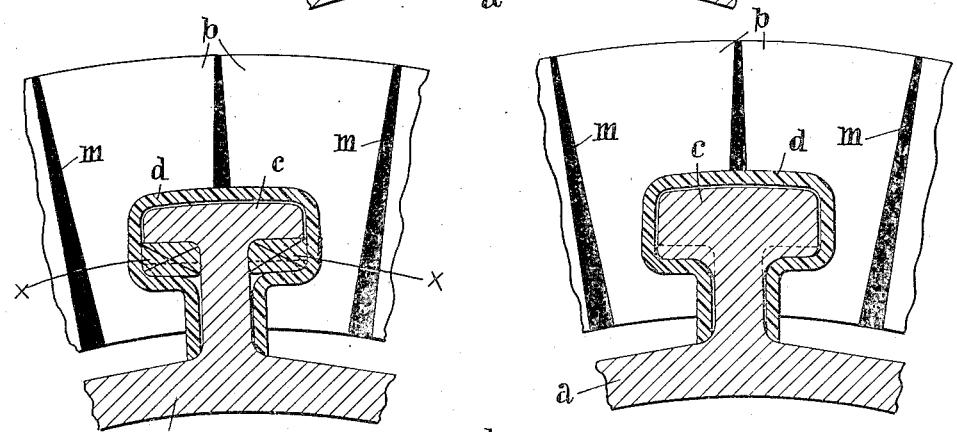
Figure 3:
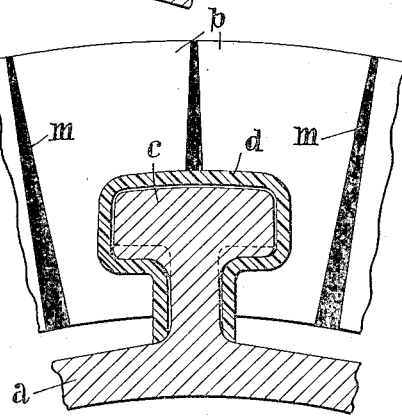

In carrying the invention into effect according to one modification as shown in Figs. 1, 2 and 3 a sleeve *a* which may or may not be part of the spindle is used having longitudinal projections *c* with T shaped heads, the number of these projections being equal to half the number of the commutator bars *b*. These projections engage with corresponding slots in the side of the commutator bars, suitable insulation *d* being of course provided. These T shaped projections may run the whole length of the commutator as shown at *x*, Fig. 11 or may be interrupted as shown at *y;* further we provide in most cases, to fit under the projecting part of the T shaped projection *c* from the center sleeve, wedges *e* within the insulation so as to draw the commutator bars *b* toward the center in a radial direction. These wedges are preferably double, one being driven in from either end, and may if preferred be disposed outside the insulation. The arrangement of these wedges may vary in a number of ways, thus as shown in Fig. 2 a single wedge may be used with either the T shaped projections c or the grooves in the commutator machined to a taper in such a way as to correspond, and give the required wedging action in combination, with the wedges e. According to another form of this construction shown in Fig. 3, the wedges may be dispensed with altogether and the T shaped projections tapered in one direction to correspond with the grooves in the commutator bars tapered in the opposite direction. Thus the action of forcing in the center sleeve will have the effect of drawing the commutator bars radially inward and tightening up the construction. The essential part of the invention is that the commutator bars are forced radially inward and are prevented from moving outward under centrifugal forces.

Figure 4:
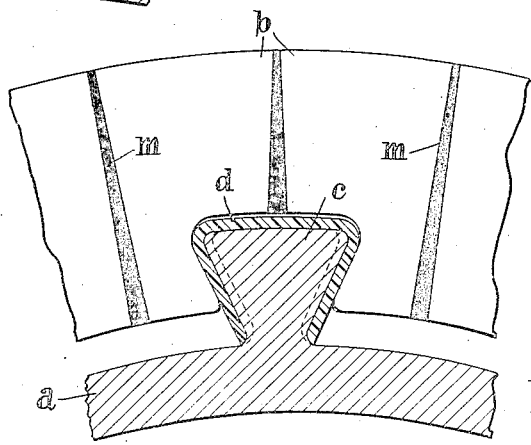

Fig. 4 shows another modification in which the projections c on the center sleeve may be of a dovetailed shape tapering throughout their whole length. The area of the projections at one end being smaller than the other, while the grooves in the commutator bars taper in the opposite direction, thus when the commutator bars are assembled with the insulation d the pressure required to force the center sleeve into position will draw all the bars radially inward. These dovetail shaped projections are shown in the upper halves of Figs. 10 and 11, the before mentioned T shaped projections in the lower halves of these figures. The dovetail shaped projections may also be either continuous or interrupted, as shown in the upper part of Fig. 11.

If preferred in all the above modifications the projections instead of being part of a separate sleeve as shown in Fig. 11 may be a part of the commutator shaft itself, the commutator being built up and forced on over the shaft and projections.

In the constructions hitherto described, the sleeve has half as many projections as there are commutator bars, but it is clearly possible especially in cases where the commutator bars are few in number and large in cross section, to have the same number of projections as there are commutator bars, and then the dovetails or grooves may be cut in both sides of the commutator bars, as in Fig. 5, or a single dovetail or T piece placed in the center of each of the bars as in Figs. 6 and 7.

In the arrangements described, since there are no rings external to the commutator, it is possible that as the commutator wears down there may be a tendency for the mica to fly out from between the segments. We prefer therefore, in some cases to make the mica m between the segments thicker on the inside of the segments than it is on the outside as shown in the drawings or in other words, to taper the mica in such a way that in order to escape from between the adjacent commutator bars, it would have to force the commutator bars apart.

According to another modification shown in Fig. 8 the commutator may be held together by linking each segment b to its neighbor on each side by linking members p and thus producing a commutator capable of holding itself together as a ring against centrifugal force.

As shown in Fig. 9 instead of being separate pieces these linking members p may be formed as projections on one side of each of the commutator bars, each projection interlocking with a corresponding recess in the adjacent side of the bar next thereto.

Having now described our invention what we claim as new and desire to secure by Letters Patent is:—

1. In commutators for dynamo electric machines and in combination, longitudinally grooved conducting segments, insulation between said segments, said segments and insulation together forming a unit having a cylindrical outer surface, and means internal to said cylindrical surface for holding said segments against centrifugal force, said means including tapered members engaging with said segments within said grooves, as set forth.

2. In commutators for dynamo electric machines and in combination, longitudinally grooved conducting segments, insulation between said segments, said segments and insulation together forming a unit having a cylindrical outer surface, means internal to said cylindrical surface for holding said segments against centrifugal force, said means including tapered members engaging with said segments within said grooves, and insulation between said members and said segments, as set forth.

3. In commutators for dynamo electric machines and in combination, longitudinally grooved conducting segments, insulation between said segments, a central sleeve, longitudinal projections on said sleeve, engaging with each of said segments within said grooves, insulation and wedging means between said projections and said segments, as set forth.

4. In commutators for dynamo electric machines and in combination, longitudinally grooved conducting segments, insulation between said segments, a central sleeve, longitudinal projections on said sleeve engaging with each of said segments within said groove, insulation and wedging means between said projections and said segments and insulation between said segments and said wedging means, as set forth.

5. In commutators for dynamo electric machines and in combination longitudinally grooved conducting segments, insulation between said segments, a central sleeve, longitudinal T shaped projections on said sleeve engaging with each of said segments within said grooves, insulation and wedging means between said projections and said segments, as set forth.

6. In commutators for dynamo electric machines and in combination, longitudinally grooved conducting segments, insulation between said segments, a central sleeve, longitudinal T shaped projections on said sleeve engaging with each of said segments within said grooves, wedging means between said projections and said segments, and insulation between the said segments and the wedging means, as set forth.

7. In commutators for dynamo electric machines and in combination, longitudinally grooved conducting segments, insulation between said segments, a central sleeve, longitudinally tapered projections on said sleeve engaging with said grooves in said segments, insulation and wedging means between said projections and said segments, as set forth.

8. In commutators for dynamo electric machines and in combination, longitudinally grooved conducting segments, insulation between said segments, a central sleeve, longitudinally tapered projections on said sleeve, engaging with said grooves in said segments, wedging means between said projections and said segments, and insulation between the said segments and the wedging means, as set forth.

In testimony whereof, we affix our signatures in presence of two witnesses.

CHARLES ALGERNON PARSONS.
ALEXANDER HENRY LAW.
JOSEPH PEARCE STOCKBRIDGE.

Witnesses:
FREDERICK GORDON HAY BEDFORD,
ALBERT WILLIAM PARR.